(12) United States Patent
Lee

(10) Patent No.: US 7,122,924 B2
(45) Date of Patent: Oct. 17, 2006

(54) ROTOR DEVICE CAPABLE OF FORCING HEAT DISSIPATION

(75) Inventor: Ming-Che Lee, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/056,095

(22) Filed: Feb. 14, 2005

(65) Prior Publication Data

US 2006/0181163 A1 Aug. 17, 2006

(51) Int. Cl.
*H02K 9/00* (2006.01)
(52) U.S. Cl. .............................. 310/62; 310/58; 310/64
(58) Field of Classification Search .................. 310/52, 310/54, 58, 64, 62; 417/354; 416/93 R
See application file for complete search history.

(56) References Cited

U.S. PATENT DOCUMENTS

| | | | |
|---|---|---|---|
| 6,744,157 B1 * | 6/2004 | Choi et al. ..................... | 310/62 |
| 6,750,578 B1 * | 6/2004 | Buening et al. ............... | 310/89 |
| 6,773,239 B1 * | 8/2004 | Huang et al. ................ | 417/354 |
| 6,815,849 B1 * | 11/2004 | Serizawa et al. ............. | 310/62 |

* cited by examiner

*Primary Examiner*—Darren Schuberg
*Assistant Examiner*—Nguyen Hanh

(57) ABSTRACT

A rotor device capable of forcing heat dissipation includes a hub and an inner casing. The hub provides a closed end with at least a through hole radially disposed thereon and a projection extending therefrom along the circumference of the through hole. The inner casing is disposed in the hub. Fluid is forced by the projection to move outward or inward via the through hole so that temperature of the fluid in the hub and the inner casing can be lowered down.

5 Claims, 20 Drawing Sheets

ROTOR DEVICE CAPABLE OF FORCING HEAT DISSIPATION

BACKGROUND OF THE INVENTION

1. Field of the Invention

The present invention is related to a rotor device capable of forcing heat dissipation and particularly to a device to force heat generated during the rotor rotating.

2. Brief Description of the Related Art

Referring to FIG. 1, a conventional rotor assembly of a fan motor includes a fan frame 11 and a hub 12. The fan frame 11 provides a support base 111 with a collar bush 112. A bearing 113 is received in the collar bush 112 and a stator 13 is disposed to surround and fit with the collar bush 112 such that the stator 13 can be attached to the support base 111. The hub 12 has main wall and a circumferential wall such that a space can be defined to receive a shield member 14. The shield member 14 also has a main wall and a circumferential wall to define a space for receive a rotor 15. A plurality of fan blades 121 are radially disposed outside the hub 12 and a spindle 16 is joined to the hub 12 and the shield member 14 at an end thereof and passes through the bearing 113 to allow the hub 12 and the shield member 14 being movably attached to the support base 111.

When the stator 13 and the rotor 15 of the fan motor are magnetized to drive the hub 12 and the shield member 14 rotating due to change of phase, the fan blades thus rotates to move fluid and performs heat dissipation to the hot objects. However, the problem of conventional rotor assembly resides in that heat can be generated from running of the stator 13 and the rotor 15 and most of the heat stays in the hub without removing because of the shield member being enclosed in the hub with poor heat transfer. In this way, a great deal of heat stays in the hub to lead shortened life span of the motor and to increase heat in the system.

Further, US Publication No. 2004/0075356 entitled FAN ROTOR includes a tubular hub having a closed-end wall and an inner wall, with a metal ring receiving in the tubular hub in engagement with the inner wall. The metal ring has a magnet ring embedded therein. Furthermore, the tubular hub is provided with a plurality of retainers for releasably holding the metal ring in the tubular hub.

The problem of the preceding prior art is in that fluid in the hub flows in a swirl way during the hub rotating and the flowing path of the fluid is inconsistent with orientations of the through holes such that fluid inside the hub is not easy to flow outward via the through holes and low convection efficiency is obtained with ineffective heat dissipation.

SUMMARY OF THE INVENTION

An object of the present invention is to provide a rotor device capable of forcing heat dissipation in which the hub provides a closed end with at least a through hole and a projection and the projection extends from the closed end along circumference of the through hole so that the projection forces the fluid to move inward or outward via the through hole to reduce temperature of the fluid in the hub.

In order to achieve the preceding object, the rotor device capable of forcing heat dissipation includes a hub and a n inner casing. The hub provides a closed end with at least a through hole radially disposed thereon and a projection extending therefrom along the circumference of the through hole. The inner casing is disposed in the hub. Fluid is forced by the projection to move outward or inward via the through hole so that temperature of the fluid in both of the hub and the inner casing can be lowered down.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
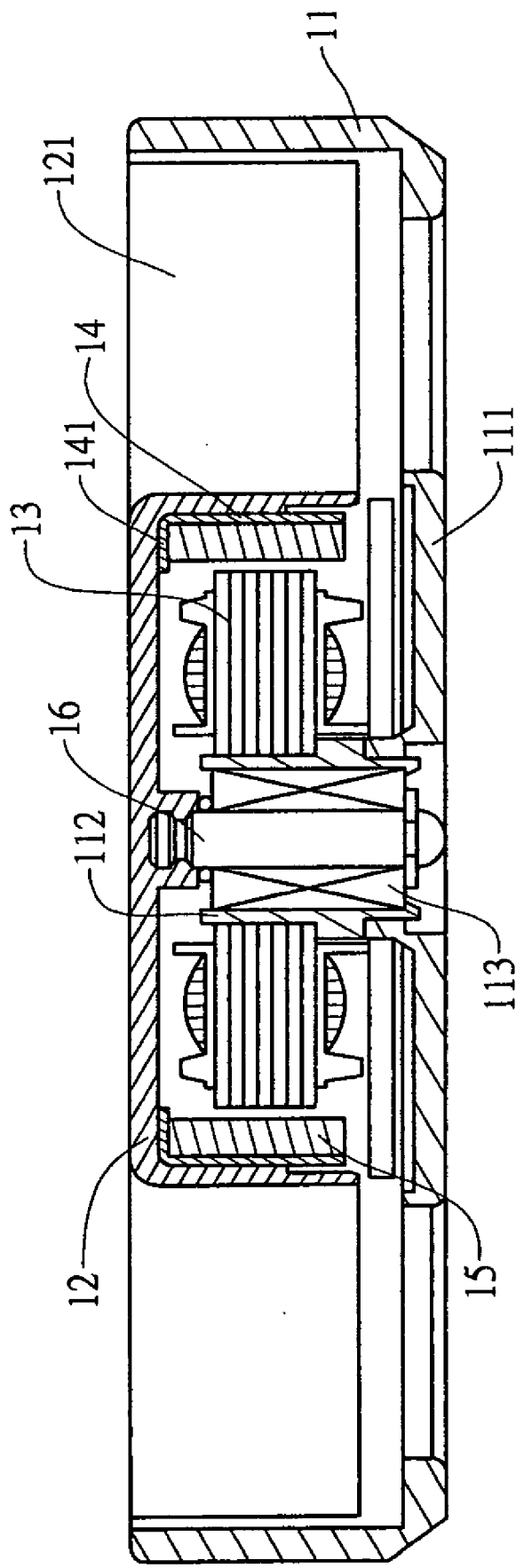
FIG. 1 is a sectional view of the conventional fan rotor assembly.
Figure 2:
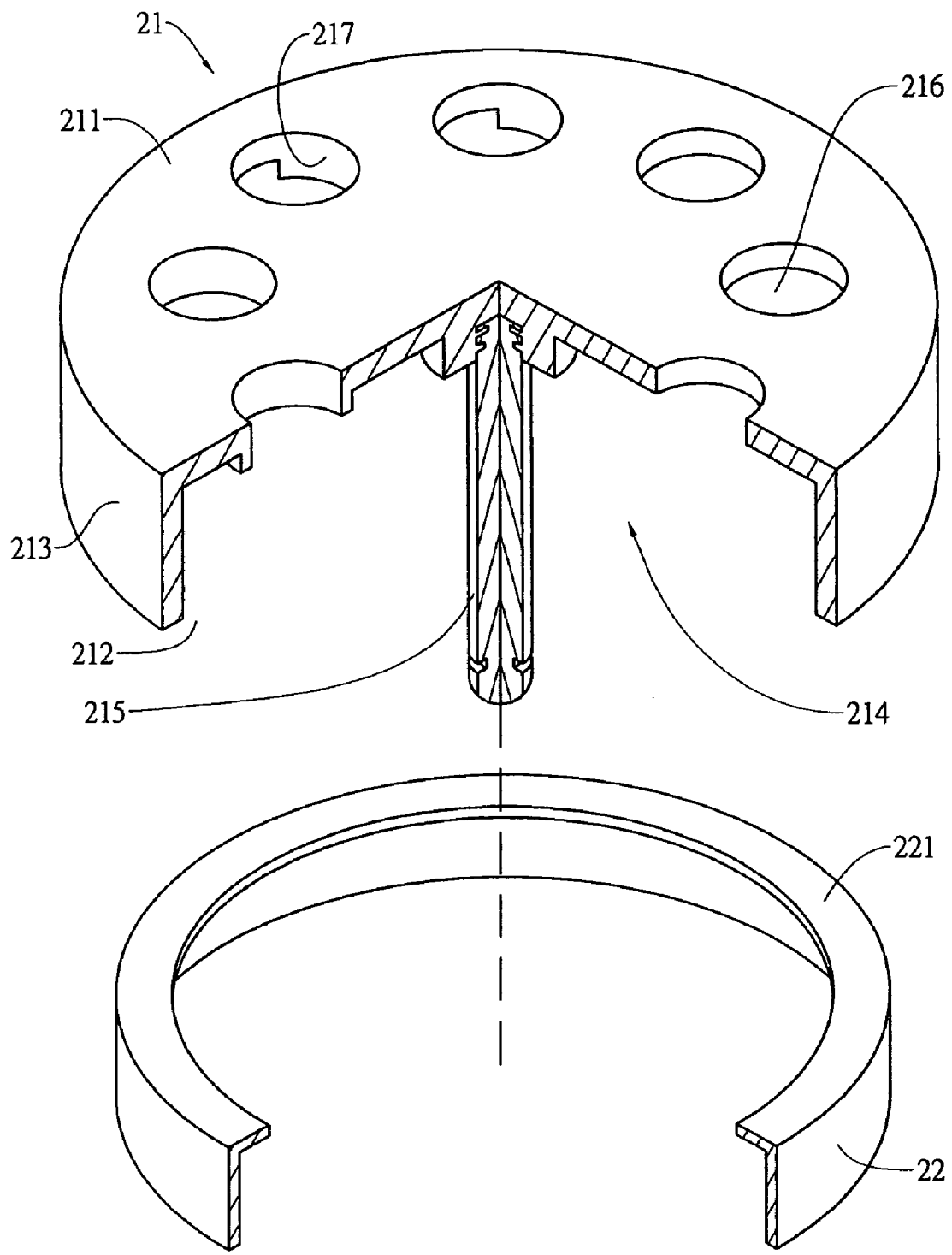
FIG. 2 is a disassembled partly sectional perspective view of the first preferred embodiment of a rotor device capable of forcing heat dissipation according to the present invention.
Figure 3:
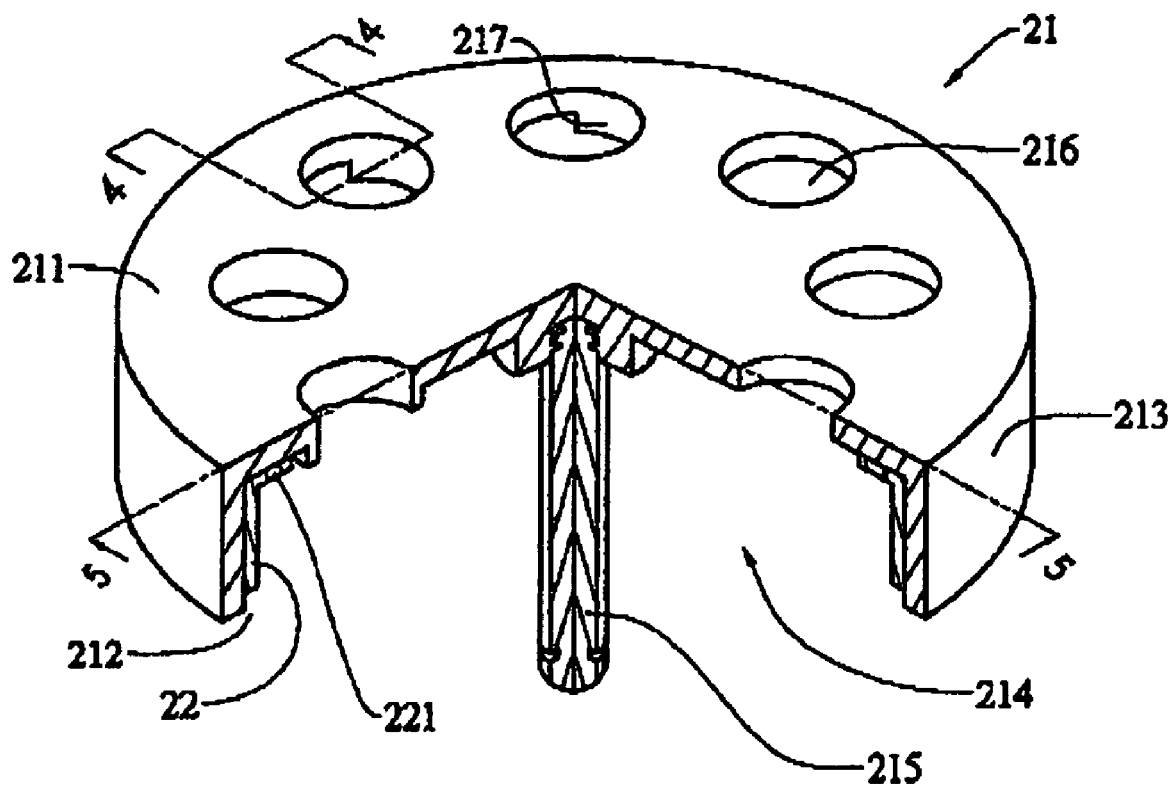
FIG. 3 is an assembled partly sectional perspective view of FIG. 2.
Figure 4:
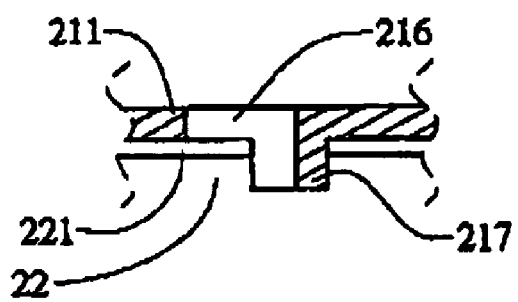
FIG. 4 is a sectional view along line 4—4 of FIG. 3.
Figure 5:
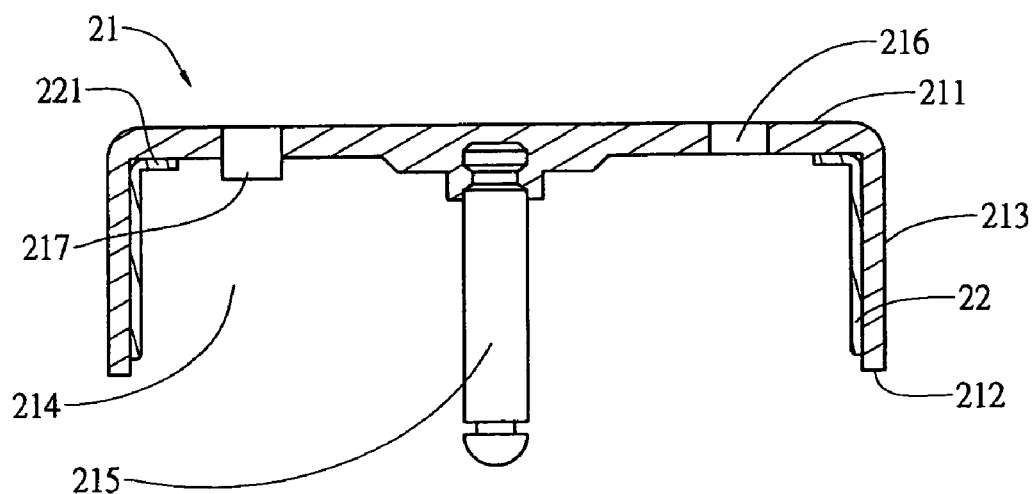
FIG. 5 is a sectional view along line 5—5 of FIG. 3.
Figure 6:
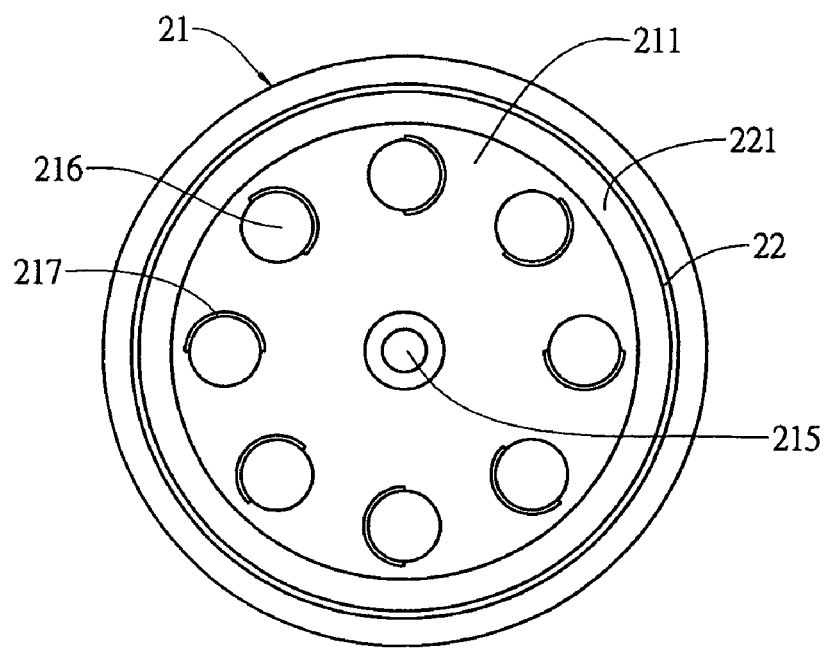
FIG. 6 is a bottom view of the first preferred embodiment of a rotor device capable of forcing heat dissipation according to the present invention.
Figure 7:
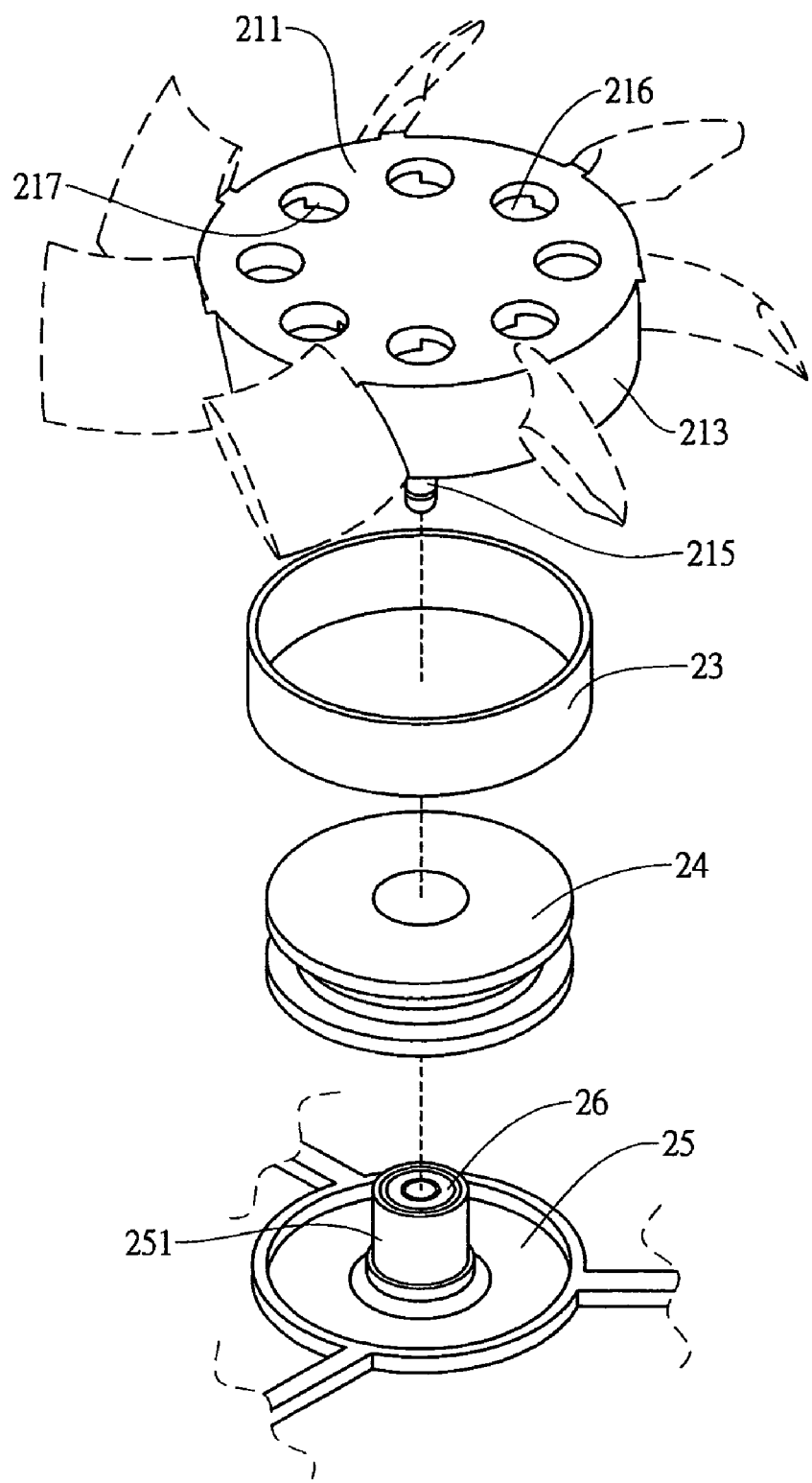
FIG. 7 is a disassembled perspective view illustrating the first embodiment of a rotor device capable of forcing heat dissipation according to the present invention applied to a fan motor.
Figure 8:
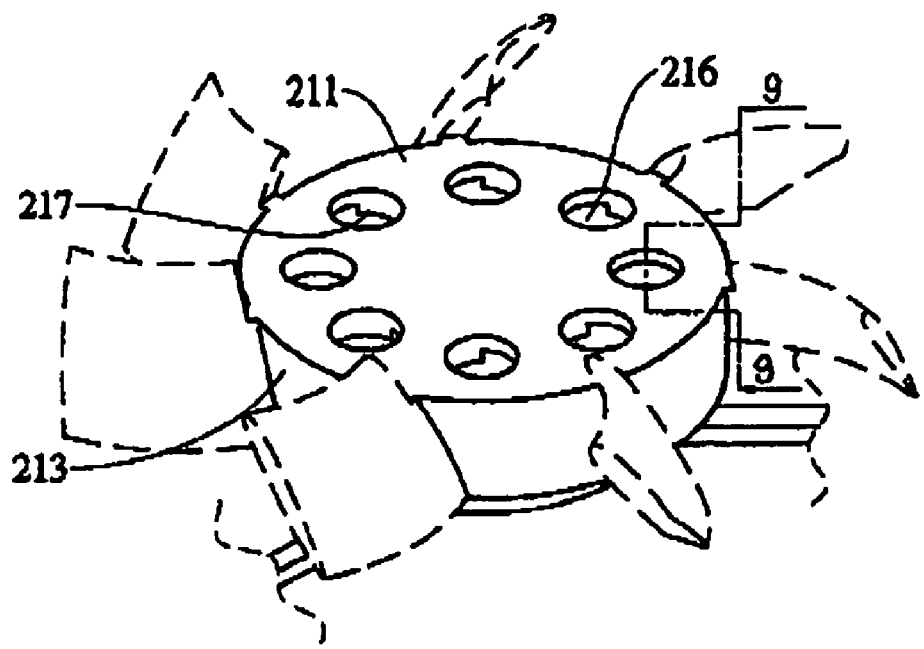
FIG. 8 is an assembled perspective view of FIG. 7.
Figure 9:
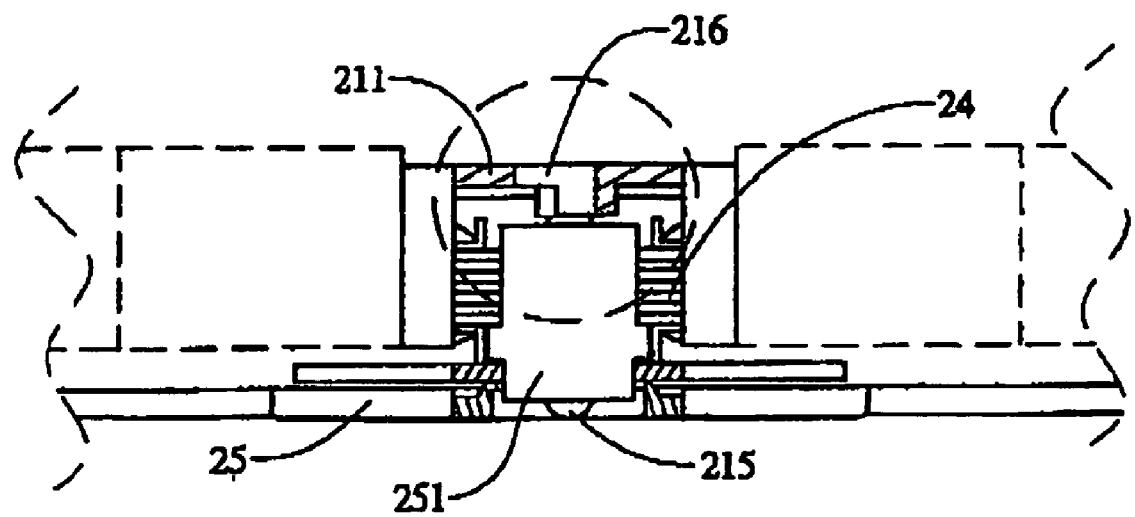
FIG. 9 is a sectional view along line 9—9 shown in FIG. 8.
Figure 10:
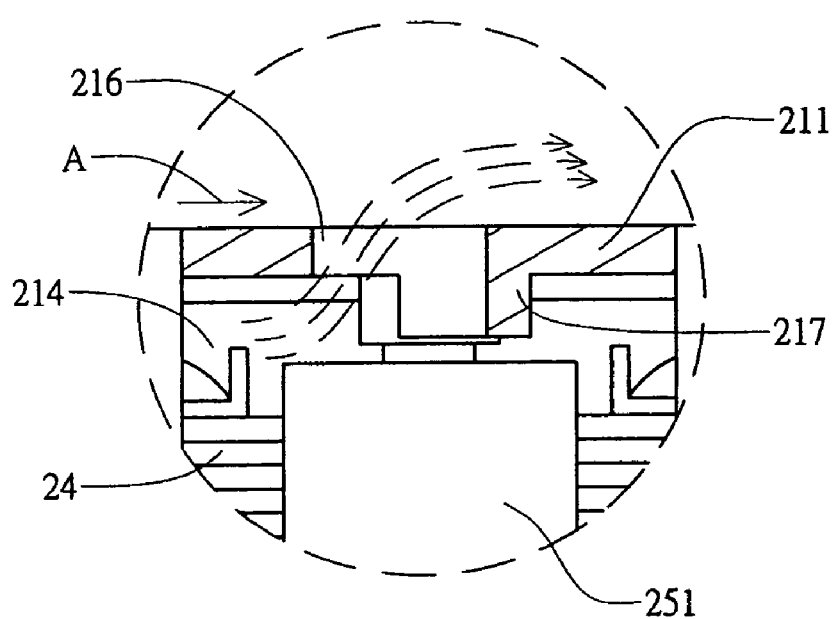
FIG. 10 is an enlarged view of the part enclosed by the dash circle in FIG. 9 illustrating heat being dissipated.

Referring to FIGS. 2 to 6, the first embodiment of a rotor device capable of forcing heat dissipation according to the present invention is illustrated. The rotor device in the first embodiment comprises a hub 21 and an inner casing 22 disposed in the hub 21. The hub 21 has a closed end 211 and an open end 212 and a circumferential wall 213 is disposed between and connected to the two ends 211, 212 with a semi-closed receiving room 214 being formed. A shaft 215 is joined to the center of the hub 21. The closed end 211 has at least a radial through hole 216 with at least a circular plate shaped projection extending inward from the inner surface of the closed end 211 along half of the circumference of the through hole 216 as shown in FIGS. 4, 5 and 6. It is noted that both lateral sides of the projection 217 are disposed at the radial central line of the through hole 216 (not shown). The inner casing 22 is attached to the inner side of the circumferential wall 213 with a lip 221 thereof closely contacting with the closed end 211. Further, the inner casing 22 and the hub 21 are bonded with adhesives.

Referring to FIGS. 2, 7, 8, 9 and 10, the preceding first embodiment applied to a fan motor is illustrated. The fan shown in the figures is an axial flow fan but it is noted the rotor device capable of forcing heat dissipation according to the present invention can be applied to any one of other fans providing with a hub such as the centrifugal fan. It can be seen that the inner casing receives a rotor 23 and a base 25 provides an axial hollow barrel 251 with a bearing 26 inside and a stator 24 surrounding and fitting with the barrel 251. Then, the shaft 215 passes through the bearing 26 to allow the hub 21 and the inner casing 22 movably attached to the base 25 such that magnetic connection is formed between the rotor 23 and the stator 24. When the rotor 23 and stator 24 are magnetized to drive the hub 21 and the inner casing 22 rotating toward the projection 217 as arrow "A" shown in FIG. 10, fluid in the receiving room 214 occurs an action of moving and rotation of the rotor 23 and the stator 24 resulting from magnetic force produces heat due to physical change. In this way, the fluid in the receiving room 214 has the temperature thereof rise and the fluid is moved to be tangent to each other oppositely, that is, it makes the fluid hits the projection 217 and is forced to flow outward via the through holes 216 so as to occur forced convection for decreasing the fluid in the receiving room and increasing life spans and performances of the rotor 23 and the stator 24.

Figure 11:
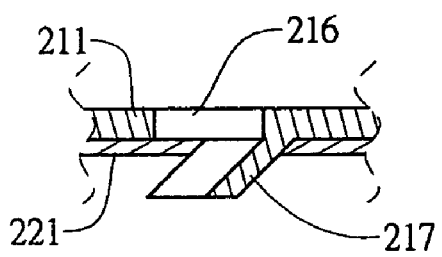
FIG. 11 is a fragmentary sectional view illustrating another type of projection part in the first embodiment of the present invention.
Figure 12:
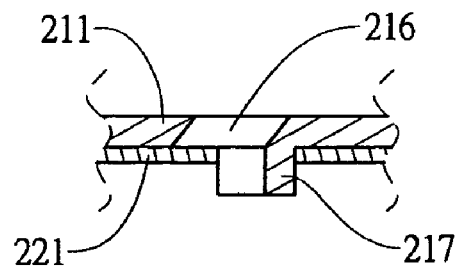
FIG. 12 is a fragmentary sectional view illustrating another type of the through hole in the first embodiment of the present invention.
Figure 13:
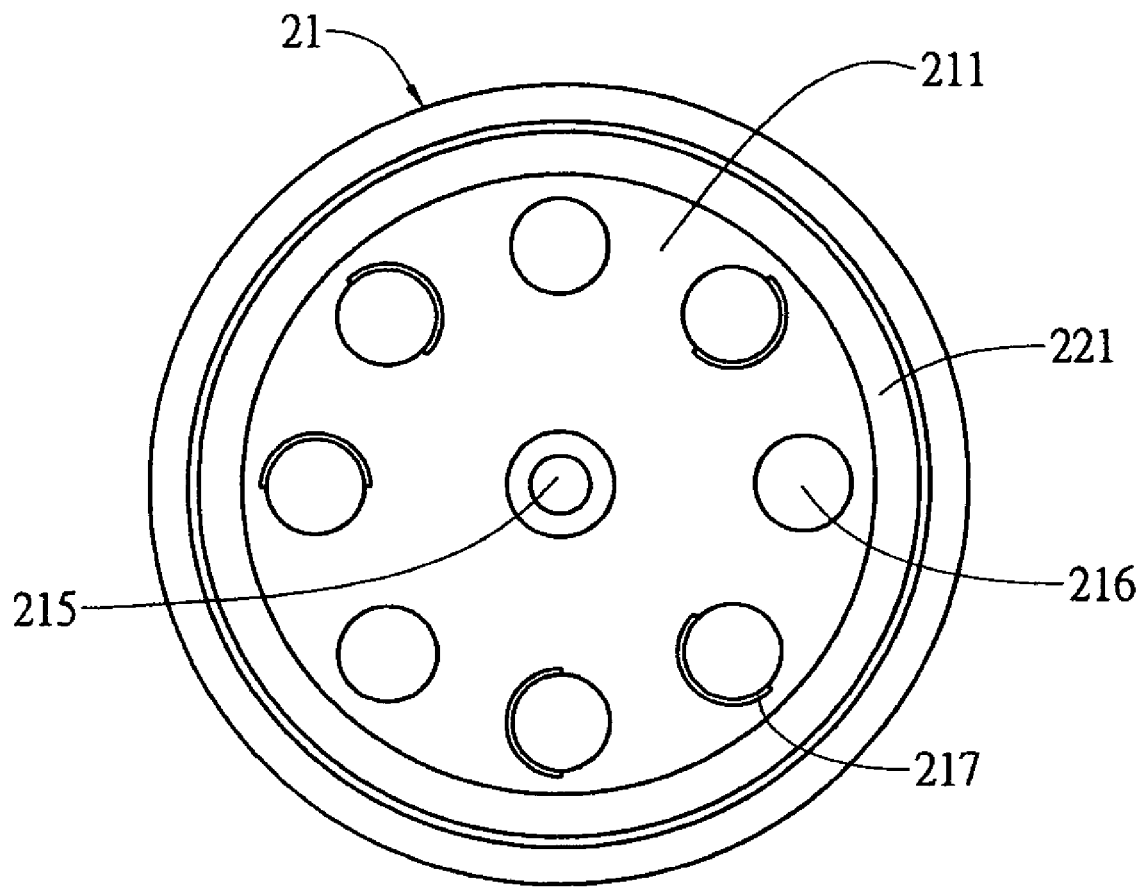
FIG. 13 is a bottom view illustrating another type through holes being disposed close to the projection part in the first embodiment of the present invention.
Figure 14:
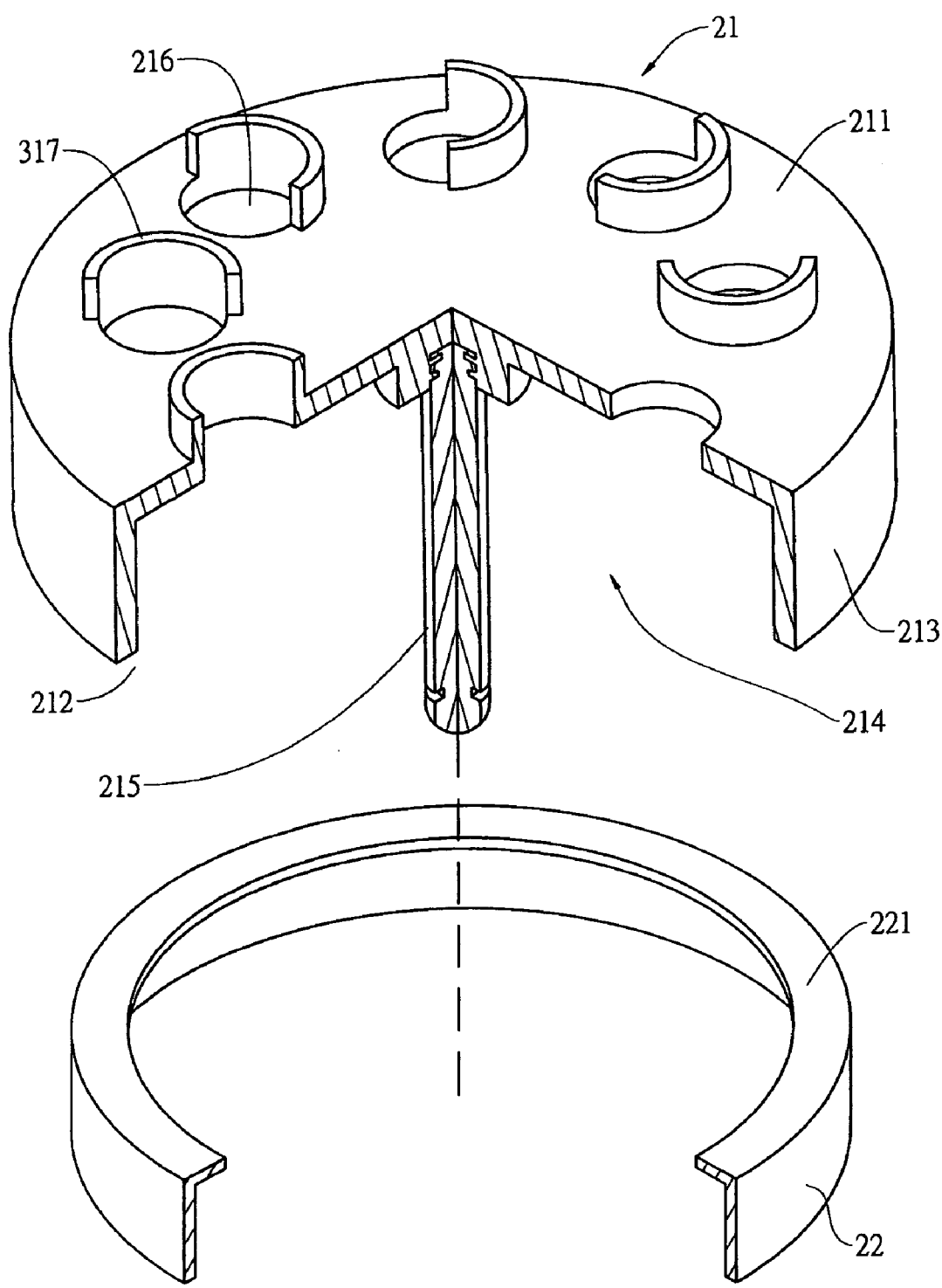
FIG. 14 is a disassembled partly sectional perspective view of the second preferred embodiment of a rotor device capable of forcing heat dissipation according to the present invention.
Figure 15:
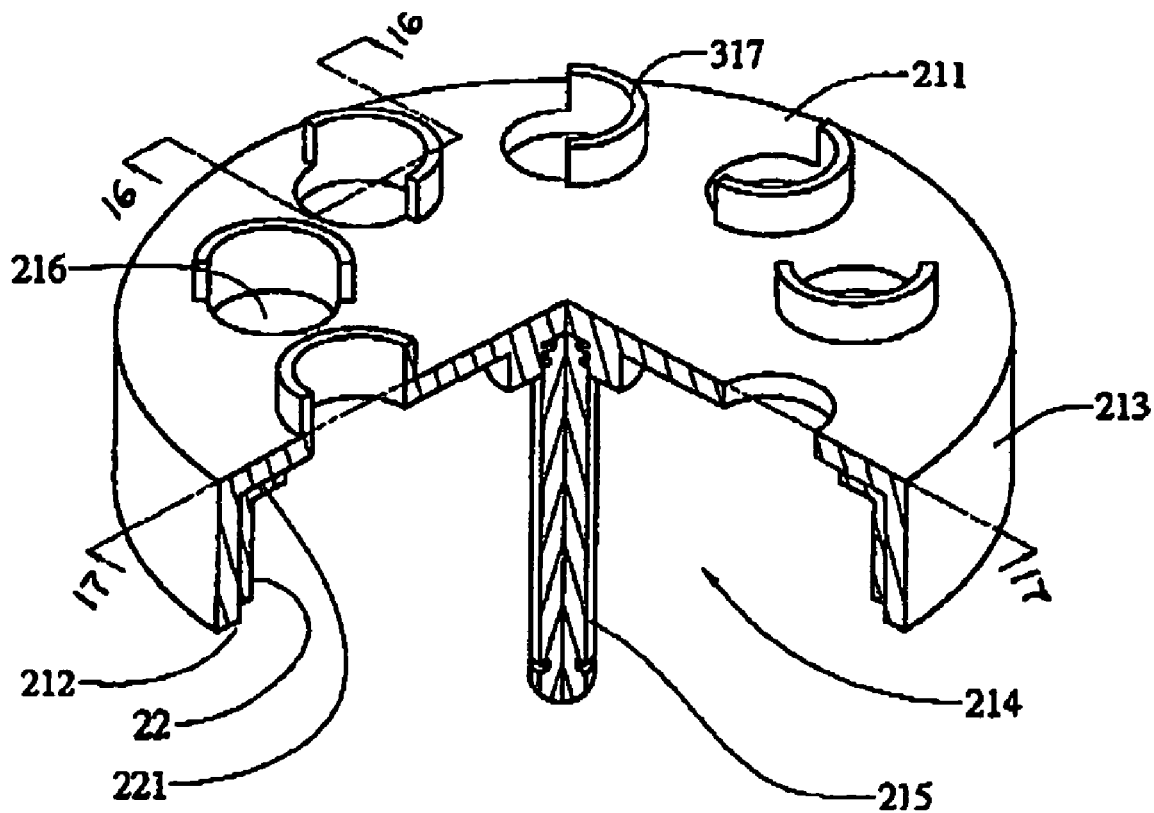
FIG. 15 is an assembled partly sectional perspective view of FIG. 14.
Figure 16:
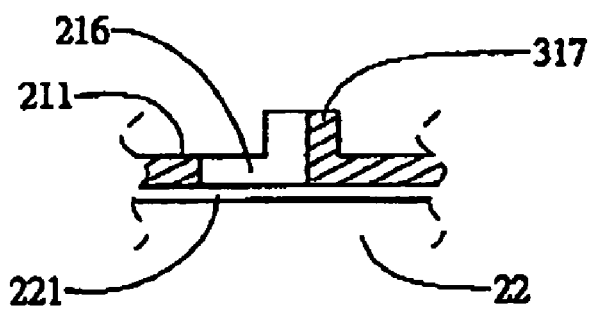
FIG. 16 is a sectional view along line 16—16 of FIG. 15.
Figure 17:
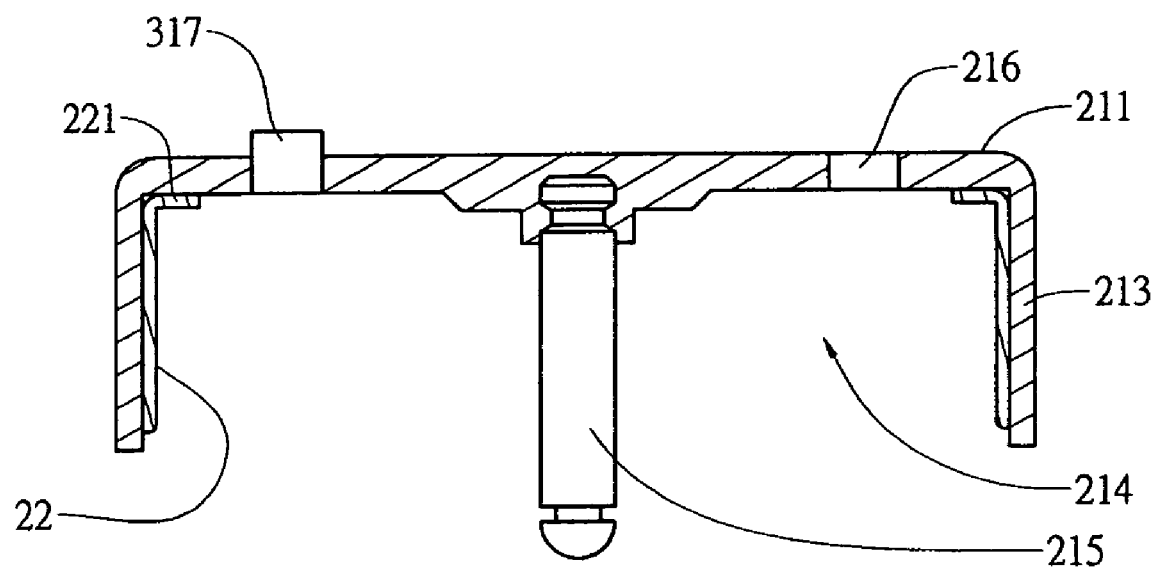
FIG. 17 is a sectional view along line 17—17 of FIG. 15.
Figure 18:
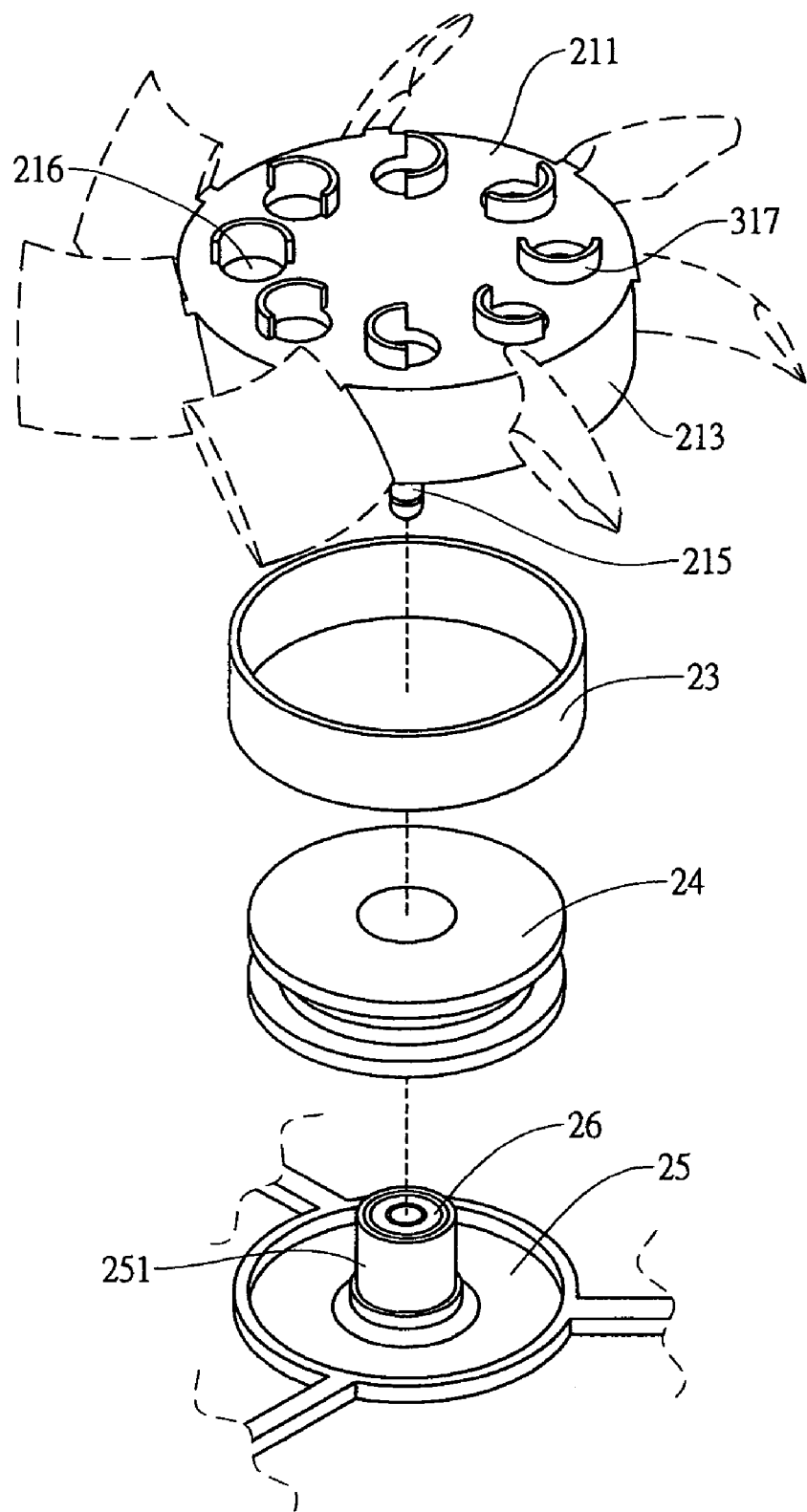
FIG. 18 is a disassembled perspective view illustrating the second embodiment of a rotor device capable of forcing heat dissipation according to the present invention applied to a fan motor.
Figure 19:
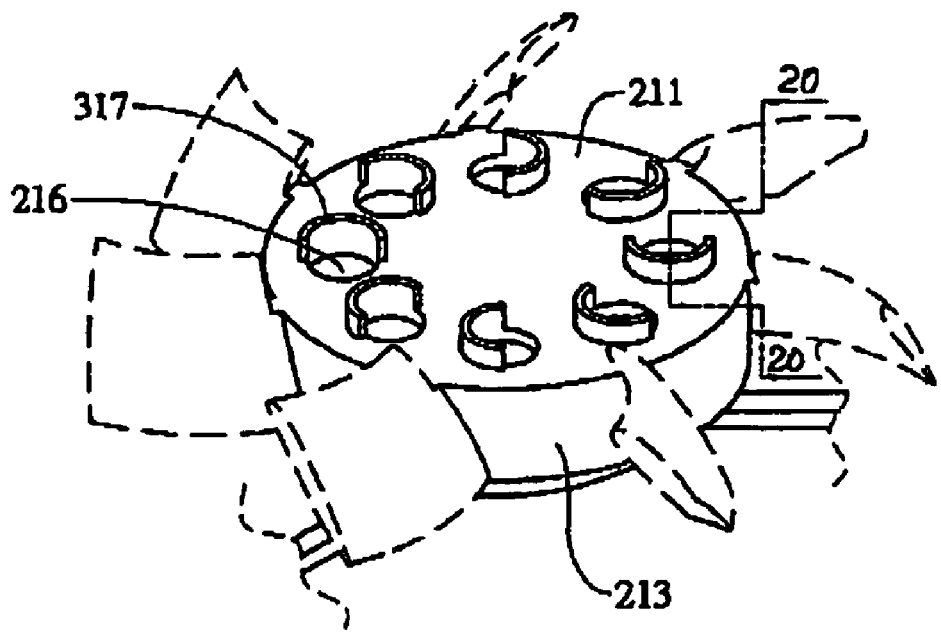
FIG. 19 is an assembled perspective view of FIG. 18.
Figure 20:
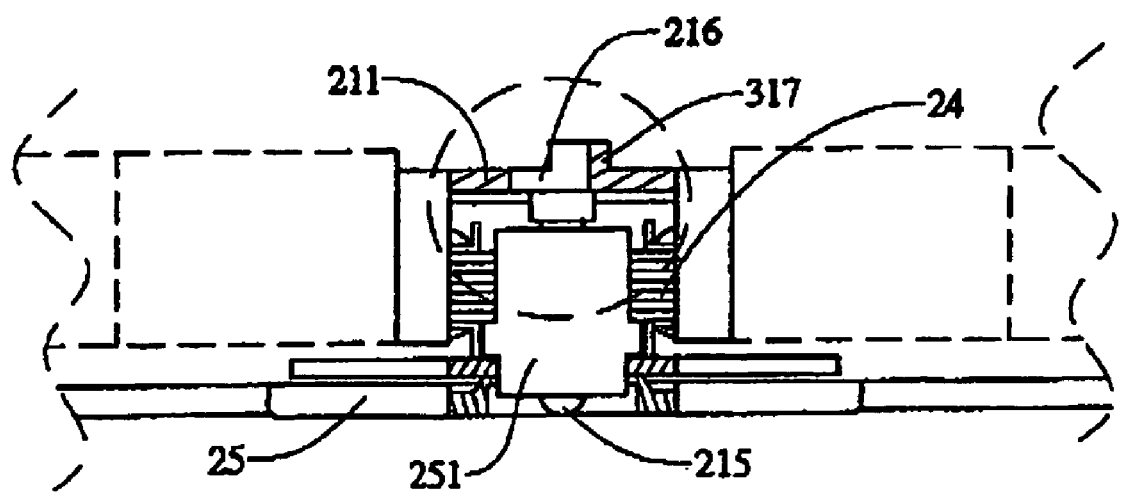
FIG. 20 is sectional view along line 20—20 of FIG. 19.

Referring to FIGS. 4, 6, 11, 12 and 12, the projections 217 can be either a non-slant shape as shown in FIG. 4 or a slant shape as shown in FIG. 11 and the wall surface of the through hole 216 can be either a non-slant shape as shown in FIG. 4 or a slant shape as shown in FIG. 12. Further, the number of through holes 216 is the same as the projections 217, that is, every through hole 216 has a projection 217 at the circumference thereof as shown in FIG. 6. Alternatively, the number of the through holes is different from the projections 217, that is part of the through holes 216 are not provided with the projections 217 at the circumferences thereof as shown in FIG. 13. The projections can be integrally joined with the hub 21 or made separated from the hub 21.

Figure 21:
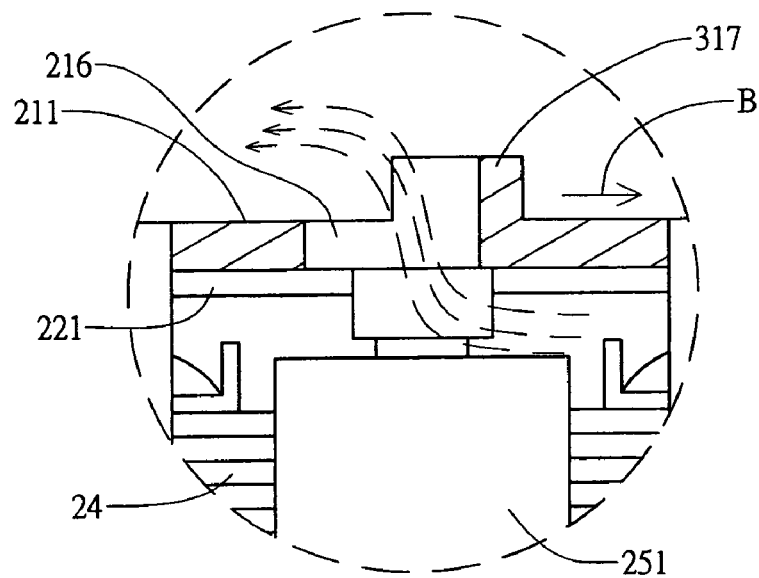
FIG. 21 is an enlarged view of the part enclosed by the dash circle in FIG. 20 illustrating heat being dissipated rightward.
Figure 22:
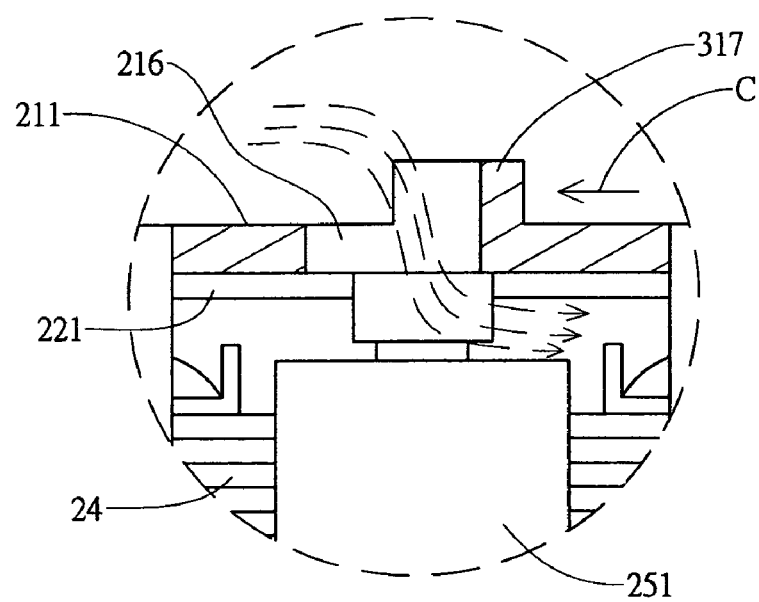
FIG. 22 is another enlarged view of the part enclosed by the dash circle in FIG. 20 illustrating heat being dissipated leftward.
Figure 23:
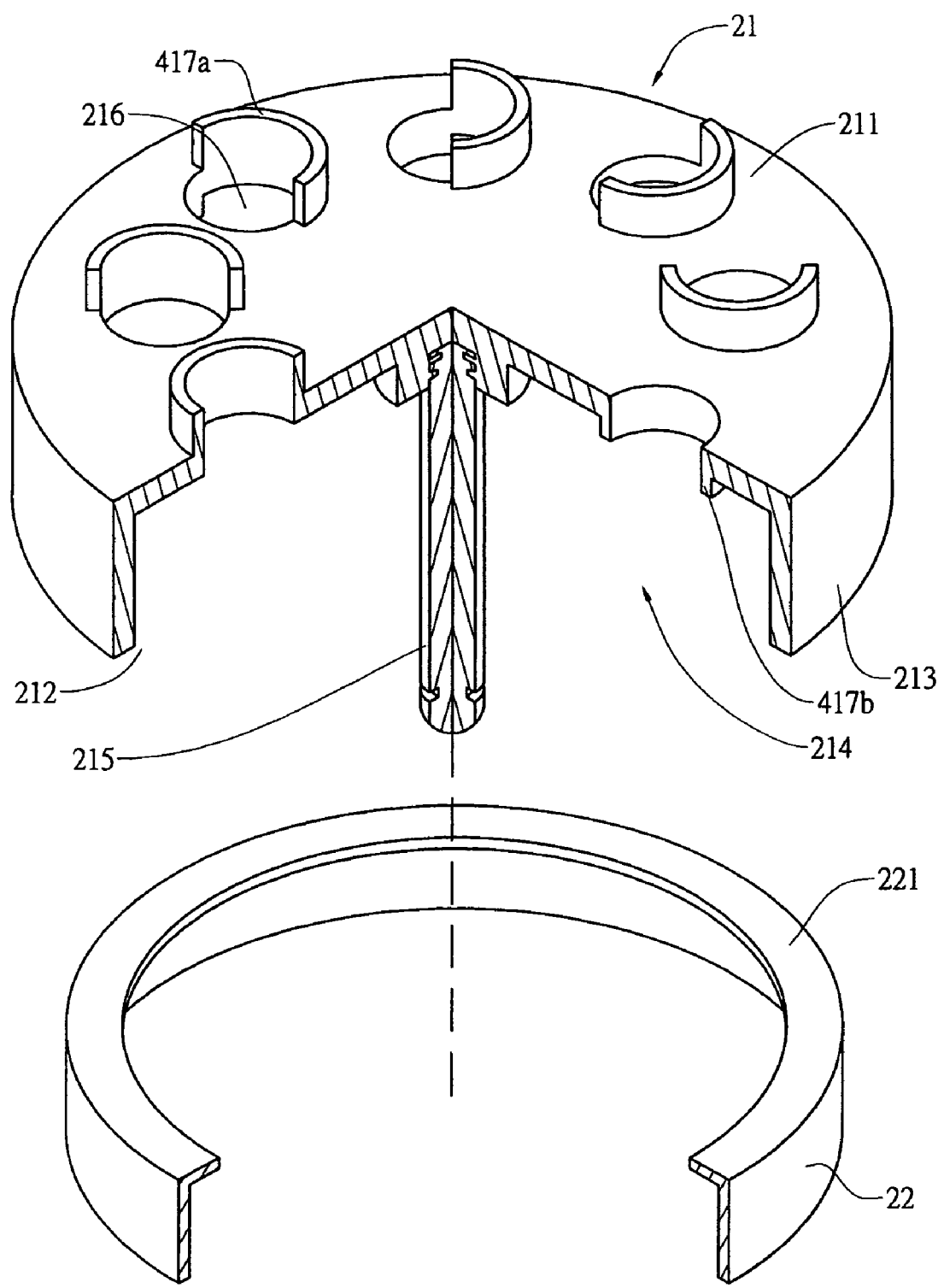
FIG. 23 is a disassembled partly sectional perspective view of the third preferred embodiment of a rotor device capable of forcing heat dissipation according to the present invention.
Figure 24:
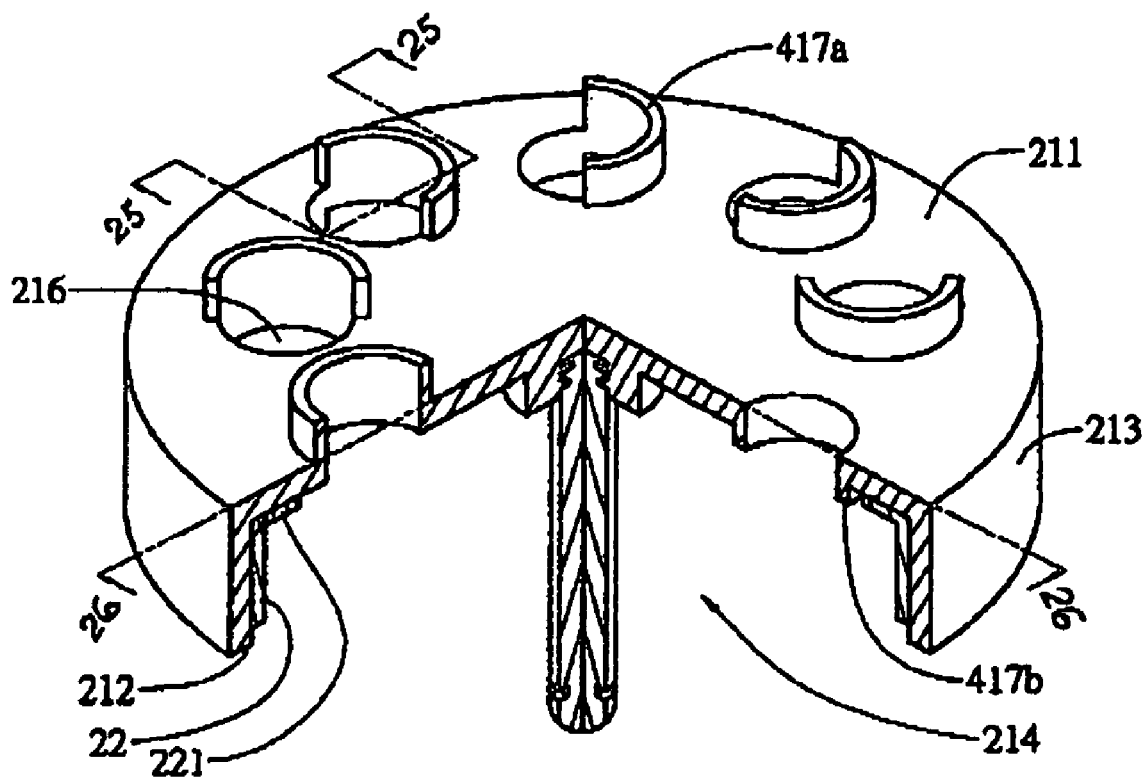
FIG. 24 is an assembled partly sectional perspective view of FIG. 23.
Figure 25:
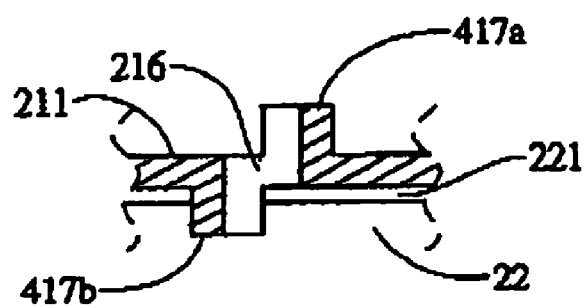
FIG. 25 is a sectional view along line 25—25 of FIG. 24.
Figure 26:
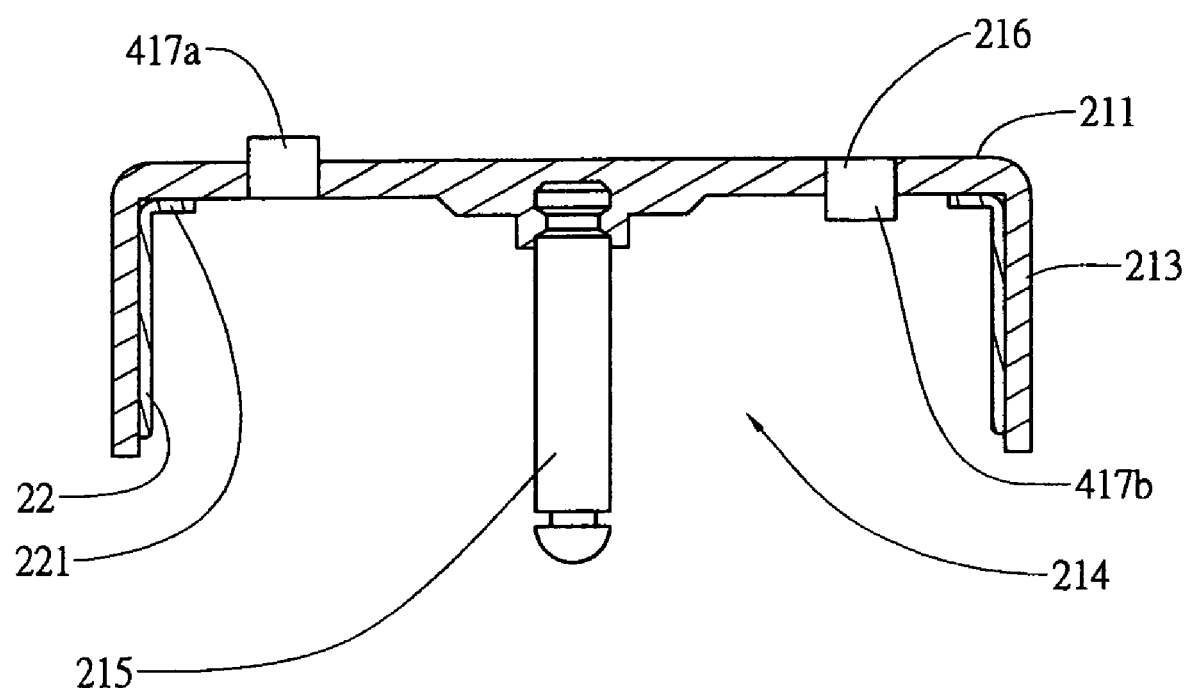
FIG. 26 is a sectional view along line 26—26 of FIG. 24.
Figure 27:
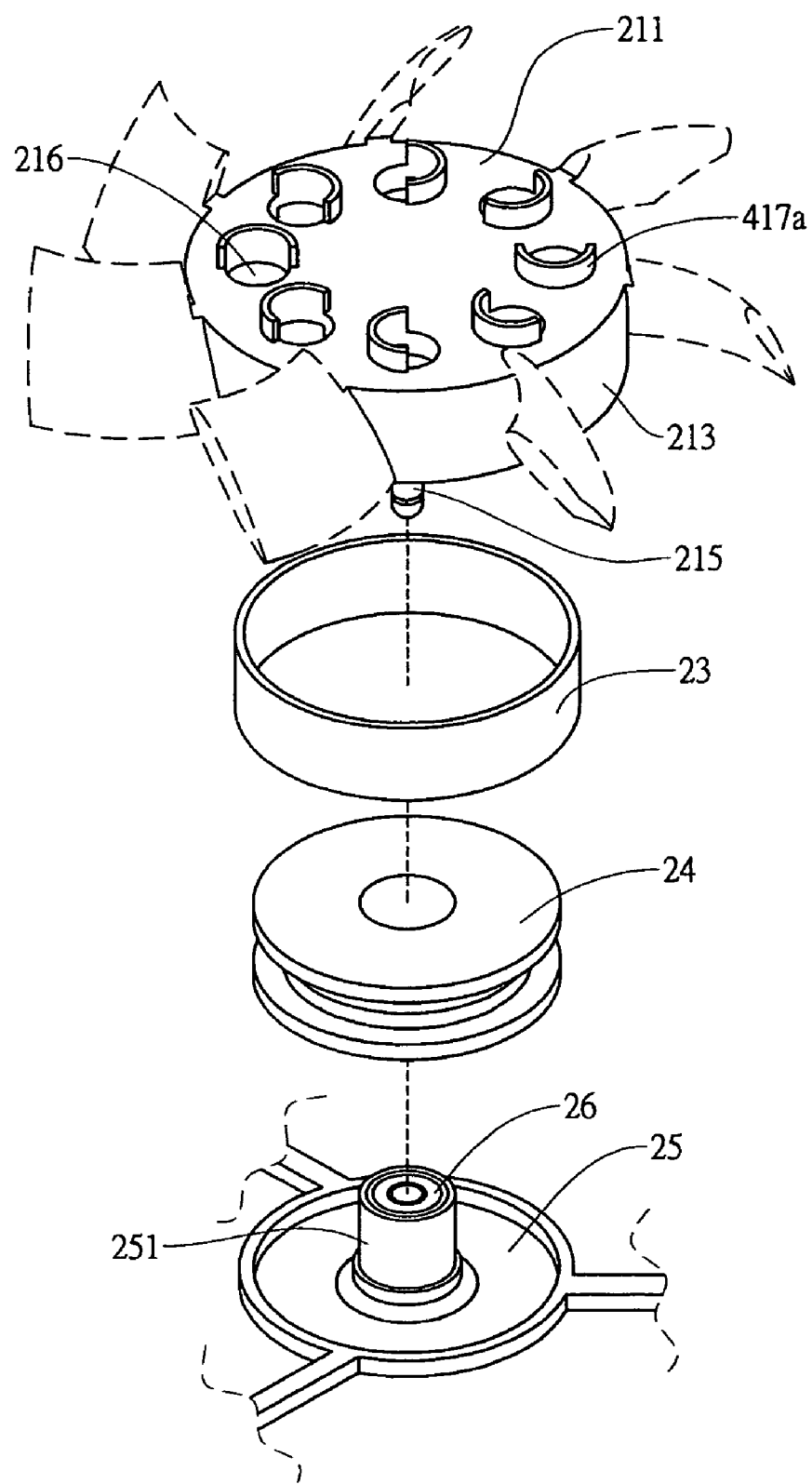
FIG. 27 is a disassembled perspective view illustrating the third embodiment of a rotor device capable of forcing heat dissipation according to the present invention applied to a fan motor.
Figure 28:
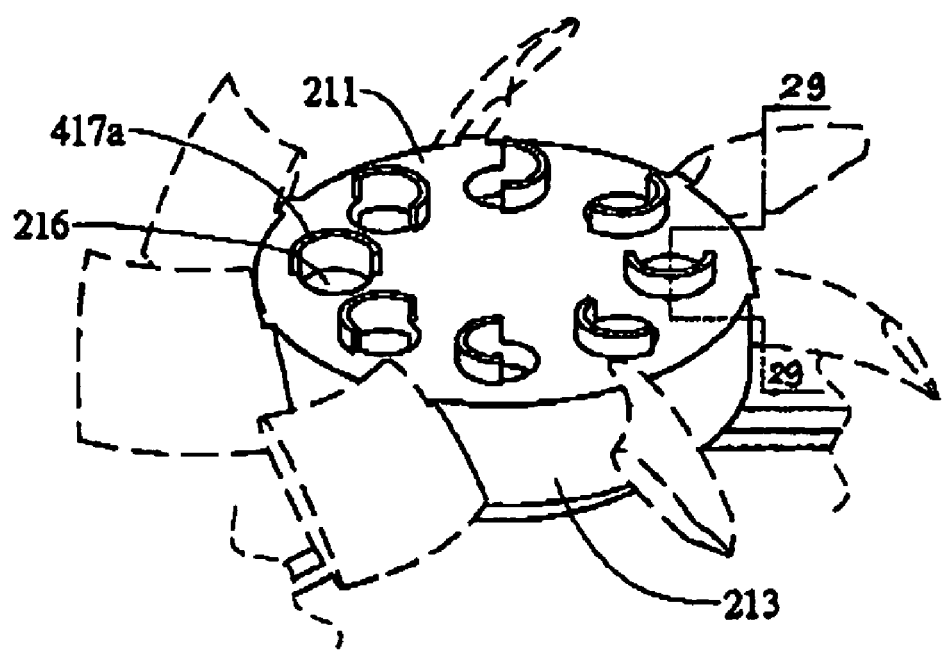
FIG. 28 is an assembled partly sectional perspective view of FIG. 27.
Figure 29:
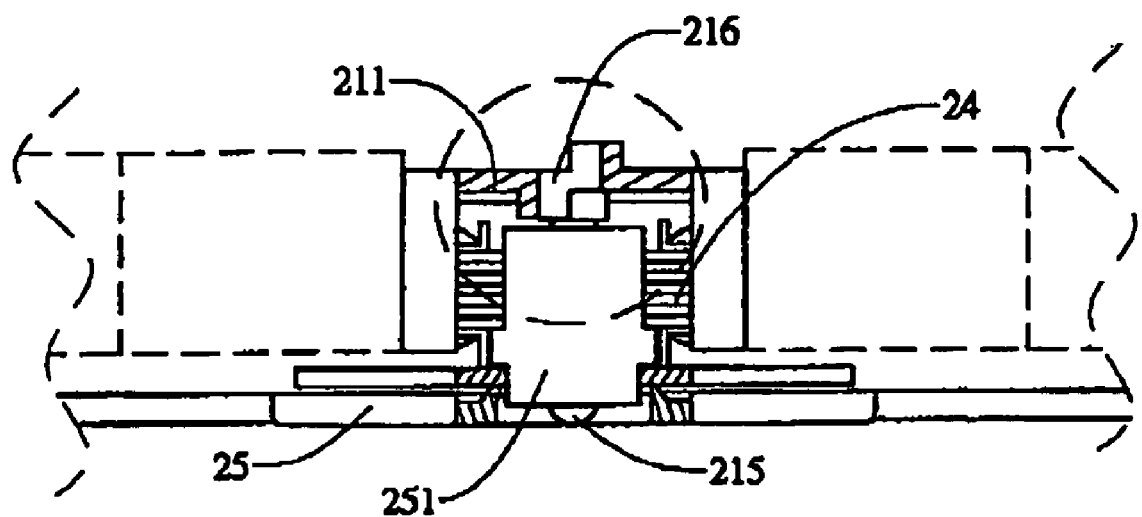
FIG. 29 is a sectional view along line 29—29 of FIG. 28.

Referring to FIGS. 14 to 22, the second embodiment of the present invention is illustrated. The entire structure of the second embodiment is about the same as the preceding embodiment so that the identical parts are designated as the same reference numbers and no detail will be described further. The difference of the second embodiment is in that the projections 317 are disposed at the outer surface of the closed end 211 as shown in FIG. 21. When the hub 21 and the inner casing 22 rotate along the direction of arrow "B", i.e., direction toward right side of the figure, the projections 317 provides a function of guiding flow to allow fluid at the top of the through holes 216 moving toward left side of the figure. Meanwhile, the fluid in the receiving room 214 moves upward via the through holes 216 instead and then moves to the left of the figure such that the fluid flows continuously with this way and temperature rose fluid in the receiving room 214 flows outward. When the hub 21 and the inner casing 22 rotate along direction of arrow C, that is, left side of the figure, fluid at the top of the projections 317 and the through holes 216 moves inversely to be tangent to the projections 317, that is, the fluid hits the projections and is guided with the projections 317 to move into the receiving room 214 via the through holes 216 and temperature of the fluid originally inside the receiving room 214 rises to occur forced convection. In this way, function of the second embodiment is performed effectively.

Figure 30:
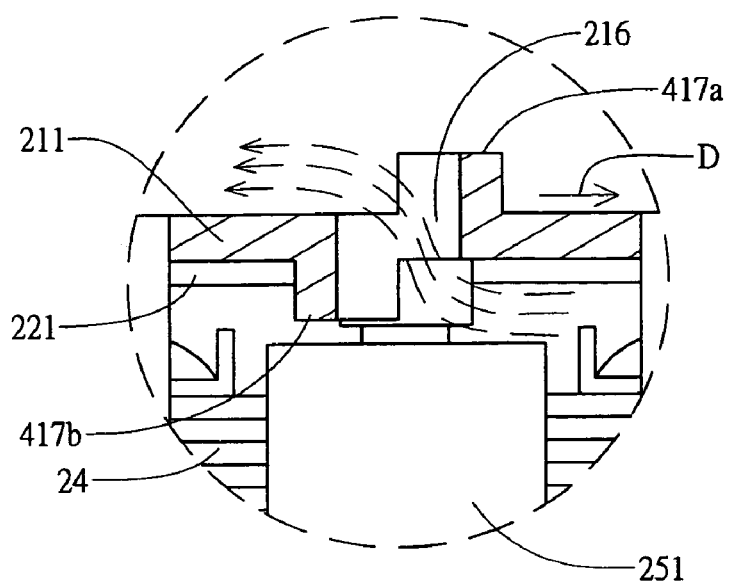
FIG. 30 is an enlarged view of the part enclosed by the dash circle in FIG. 29 illustrating heat being dissipated rightward.
Figure 31:
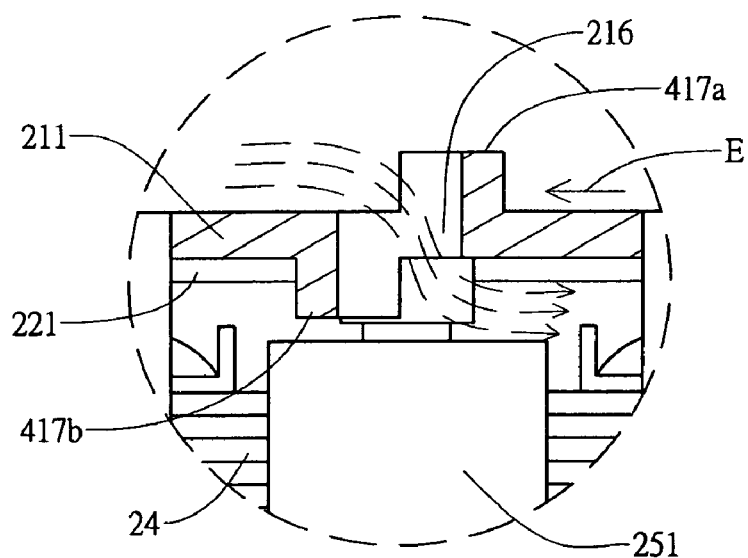
FIG. 31 is another enlarged view of the part enclosed by the dash circle in FIG. 29 illustrating heat being dissipated leftward.

Referring to FIGS. 23 to 31, the third embodiment of the present invention is illustrated. The entire structure of the second embodiment is about the same as the preceding embodiment so that the identical parts are designated as the same reference numbers and no detail will be described further. The difference of the third embodiment is in that the projections 417a, 417b are disposed at the inner and the outer surfaces of the closed end 211 respectively and extend inward or outward along the circumferences of both ends of the through holes 216. When the hub 21 and the inner casing 22 rotate along direction of arrow D as shown in FIG. 30, i.e., right side of FIG. 30, the projections 417a at the outer surface of the closed end 211 is capable of guiding fluid at top of the through holes 216 to move to the left side of FIG. 30 and projections 417b at the inner surface of the through holes 216 are inversely tangent to the fluid in the receiving room 214, that is, the fluid with increased temperature hits the projections 417b and is forced to move outward via the through holes 216. Further, when the hub 21 and the inner casing 22 rotate along direction of arrow E as shown in FIG. 31, i.e., left side of FIG. 31, the projections 417a at the outer surface of the closed end 211 force the fluid to be guided into the receiving room 214 via the through holes 216 and the fluid with increased temperature in the receiving room 214 is forced to perform convection and flows toward the open end 212 to move outward. In this way, function of the third embodiment is performed effectively.

While the invention has been described with referencing to preferred embodiments thereof, it is to be understood that modifications or variations may be easily made without departing from the spirit of this invention, which is defined by the appended claims.

What is claimed is:

1. A rotor device capable of forcing heat dissipation, comprising:

a hub with a closed end and a circumferential wall, being circular with a channel shaped cross section, providing at least a through hole circumferentially disposed at the closed end, a plurality of fan blades being joined to the circumferential wall and the center of the inner side of the close end extending a shaft opposite to the close end;

an inner casing, being annular with an L shaped cross section, being joined to the hub in a way of bonding to the inner side of the circumferential wall and the inner side of the close end;

a rotor, being disposed to fit with the inner side of the inner casing;

a stator, being disposed inside the rotor and providing a central bore; and a base, providing an axial hollow barrel to fit with the central hole of the stator and the inner side thereof fitting with a bearing for the bearing being able to fit with the shaft;

characterized in that at least a circular plate shaped projection extends inward from the inner side of the through hole along a half portion of the circumference of the through hole with two opposite straight lateral sides of the projection are disposed at a radial central line of the through hole extending from the center of the close end for fluid in the hub capable of moving outward with the heat via guidance of the projection.

2. The rotor device capable of forcing heat dissipation as defined in claim 1, wherein the projection extends inward from the inner side of close end vertically.

3. The rotor device capable of forcing heat dissipation as defined in claim 1, wherein the projection extends inward from the inner side of close end obliquely.

4. A rotor device capable of forcing heat dissipation, comprising:

a hub with a closed end and a circumferential wall, being circular with a channel shaped cross section, providing at least a through hole circumferentially disposed at the closed end, a plurality of fan blades being joined to the circumferential wall and the center of the inner side of the close end extending a shaft opposite the close end;

an inner casing, being annular with an L shaped cross section, being joined to hub in a way of bonding to the inner side of the circumferential wall and the inner side of the close end;

a rotor, being disposed to fit with the inner side of the inner casing;

a stator, being disposed inside the rotor and providing a central bore; and a base, providing an axial hollow barrel to fit with the central hole of the stator, the inner side thereof fitting with a bearing for the bearing being able to fit with the shaft;

characterized in that at least a circular plate shaped projection vertically extends outward from the outer side of the through hole along a half portion of the circumference of the through hole with two opposite straight lateral sides of the projection are disposed at a radial central line of the through hole extending from the center of the close end for fluid in the hub capable of moving outward with the heat via guidance of the projection and for fluid outside the close end moving inward via the guidance of the projection as well.

5. A rotor device capable of forcing beat dissipation, comprising:

a hub with a closed end and a circumferential wall, being circular with a channel shaped cross section, providing at least a through hole circumferentially disposed at the closed end, a plurality of fan blades being joined to the circumferential wall and the center of the inner side of the close end extending a shaft opposite the close end;

an inner casing, being annular with an L shaped cross section, being joined to hub in a way of bonding to the inner side of the circumferential wall and the inner side of the close end;

a rotor, being disposed to fit with the inner side of the inner casing;

a stator, being disposed inside the rotor and providing a central bore; and a base, providing an axial hollow barrel to fit with the central hole of the stator, the inner side thereof fitting with a bearing for fitting with the shaft;

characterized in that at least a first circular plate shaped projection extends inward from the inner side of the through hole along a half portion of the circumference of the through hole and a second circular plate shaped projection extends outward from the outer side of the through hole along another half portion of the circumference of the through hole with both circumferential lateral sides of the projections are bounded by a radial central line of the through hole extending from the center of the close end for fluid staying in the hub capable of moving outward with the heat via guidance of the projection.

* * * * *